United States Patent [19]

Osumi

[11] 4,183,266
[45] Jan. 15, 1980

[54] SHAFT SUPPORTING APPARATUS FOR PLANETARY GEAR REDUCTION DEVICE

[75] Inventor: Sinzi Osumi, Toyama, Japan

[73] Assignee: Kabushiki-Kaisha Fujikoshi, Toyamaken, Japan

[21] Appl. No.: 787,053

[22] Filed: Apr. 13, 1977

[30] Foreign Application Priority Data

Apr. 14, 1976 [JP] Japan .............................. 51-45537[U]

[51] Int. Cl.$^2$ ............................................... F16H 1/28
[52] U.S. Cl. ..................................................... 74/801
[58] Field of Search ........................................... 74/801

[56] References Cited

U.S. PATENT DOCUMENTS

| | | | |
|---|---|---|---|
| 1,945,361 | 1/1934 | Ball ......................................... | 74/801 |
| 2,401,875 | 6/1946 | Lawler ..................................... | 74/801 |
| 2,662,434 | 12/1953 | Burkhardt ................................. | 74/801 |
| 2,672,739 | 3/1954 | Wildhaber ................................ | 74/801 X |
| 3,222,954 | 12/1965 | Wuertz ..................................... | 74/801 |
| 3,518,897 | 7/1970 | Bixby ....................................... | 74/801 X |
| 3,812,928 | 5/1974 | Rockwell et al. ......................... | 74/801 X |

Primary Examiner—C. J. Husar
Assistant Examiner—Lance W. Chandler
Attorney, Agent, or Firm—Spencer & Kaye

[57] ABSTRACT

A shaft supporting apparatus for a planetary gear reduction device wherein a driven shaft having a secured flange on one end is supported by both a tapered bearing and a thrust bearing. The outside surface of the tapered bearing is secured within a counterbored recess of the housing of the gear reduction device and the inner bearing bore of the tapered bearing is journaled on the driven shaft. The thrust bearing is disposed within a space between a radially extending wall of the driven shaft flange and a radially extending interior wall of the gear reduction device housing.

In the presence of a radial force exerted on the driven shaft, the driven shaft is supported by the tapered bearing and the thrust bearing. By this simple arrangement, the required bearing space for supporting the driven shaft is minimized, thereby providing a thinner and lighter weight planetary gear reduction device.

7 Claims, 2 Drawing Figures

SHAFT SUPPORTING APPARATUS FOR PLANETARY GEAR REDUCTION DEVICE

BACKGROUND OF THE INVENTION

1. Field of the Invention

The present invention relates to a shaft supporting apparatus for a planetary gear reduction device.

2. Prior Art

A known Prior apparatus is illustrated in FIG. 1. In FIG. 1, a driven shaft 1 is mounted between a pair of rotatable radial ball bearings 3 and 4 within the planetary gear reduction housing 2. The planetary gear assembly partially shown in FIG. 1 is a simple planetary reduction device. Such an arrangement is generally used for other types of planetary gear reduces such as differential gear and compound planetary differential reduction devices. In such an arrangement, in the presence of an exerted radial force P on the driven shaft 1 outside the housing 2, the counterforces $R_1$ and $R_2$ are respectively supported by bearings 3 and 4. Therefore, the distance 1 between the two bearings 3 and 4 is dependent on and must be increased with an increase of the exerted radial force P. But increasing the distance 1 does nothing to improve the functioning of the planetary gear device. It just results in the requirement for a longer shaft and a thicker and heavier weight gear reduction housing.

SUMMARY OF THE INVENTION

It is therefore, a general object of the present invention to avoid the aforementioned drawbacks, and to provide an improved shaft supporting apparatus for a thinner and lighter weight planetary gear reduction device.

This object is achieved by a shaft supporting apparatus for a planetary gear reduction device wherein a driven shaft having a secured flange on one end is supported by a tapered bearing and a thrust bearing, instead of two radial ball bearings.

The outside surface of the tapered bearing is secured into counterbored recess of the housing of the reduction gear device, and the inner bearing bore of the tapered bearing is journaled on the driven shaft. The thrust bearing is disposed within a space between a radially extending wall of the driven shaft flange and a radially extending interior wall of the housing. Thus, in the presence of a radial force exerted on the driven shaft, its counterforces are supported by both the tapered bearing and the thrust bearing. By this arrangement, the thrust bearing is disposed within a space between two radial walls and is located a very short distance in the axial direction from the tapered bearing. Consequently the bearing space required for supporting the driven shaft is minimized; the driven shaft can be shortened as well as the housing, saving the waste space required in the above described prior art apparatus. As a result, the present invention provides thinner and lighter weight planetary gear reduction devices. According to one embodiment, both a tapered roller bearing and a thrust ball bearing are used to achieve better mechanical efficiency in a single planetary gear reduction device. A thrust roller bearing may also be used as the thrust bearing for a heavy duty type gear reduction device.

Furthermore this shaft supporting apparatus is usable for the driven shafts of differential gear reduction devices and compound planetary differential gear reduction devices, provided their shafts have a secured flange at each one end.

DETAILED DESCRIPTION OF THE INVENTION

Figure 1:
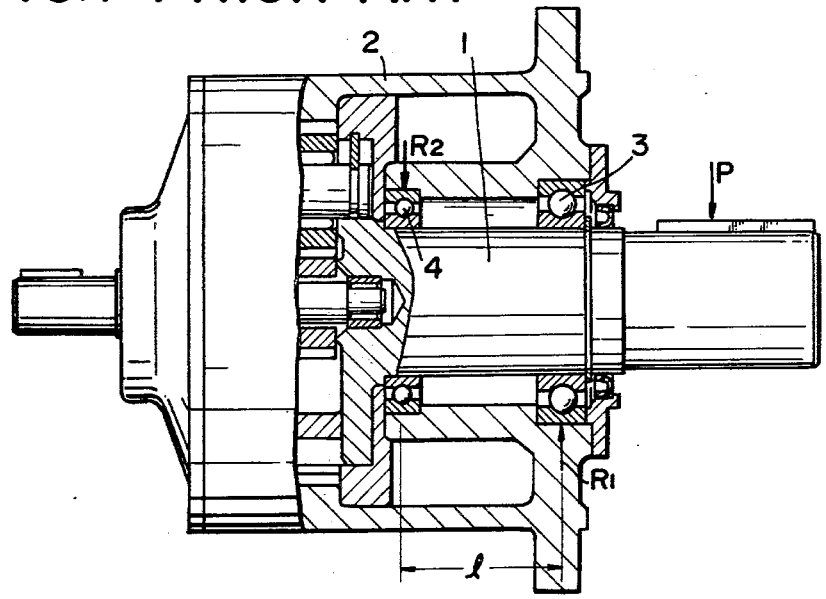
FIG. 1 is a partly cross-sectional view, partly schematic, of a simple prior art planetary gear reduction device of the traditional type.
Figure 2:
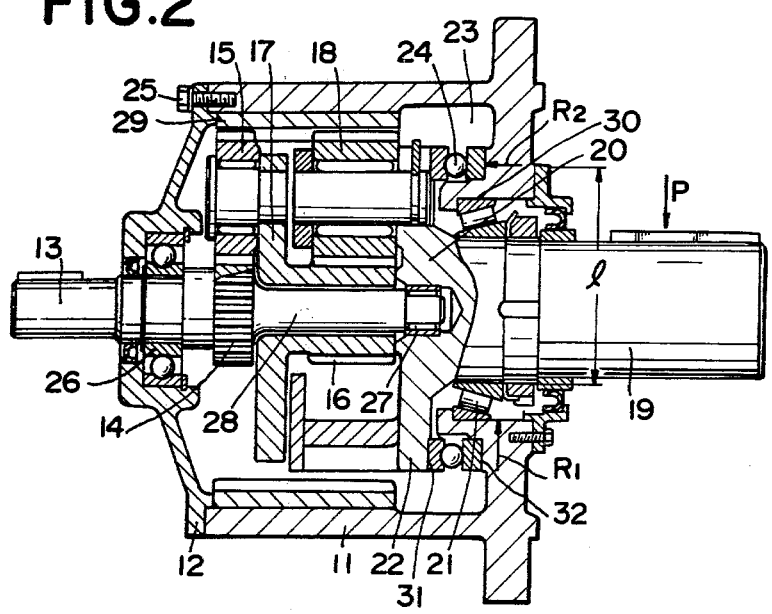
FIG. 2 is a cross-sectional view, partly schematic, of a simple planetary gear (two stage) reduction device in which the shaft supporting apparatus of the present invention is embodied.

Referring to FIG. 2, there is illustrated a cross-sectional view, partly schematic, of a simple planetary gear (two stage) reduction device. A driving shaft 13 is rotatably disposed in the cover 12 of the gear reduction device, which shaft is supported by radial ball bearing 26 and needle bearing 27. The cover 12 is fixed to a housing 11 by bots 25. The shaft 13 has a secured sun gear 14, and its extended portion 28 is disposed within a hollow cylindrical portion of a carrier 17. The shaft 13 has the same axis as the driven shaft 19 in this embodiment, and an outside surface of the needle bearing 27 is secured within the counterbored end recess of the driven shaft 19. The sun gear 14 meshes with planet gears 15 which are rotatably supported by the carrier 17. Planet gears 15 and 18 are each three in number in this embodiment, although only one of each shown is in FIG. 2. When the driving shaft 13 which may be coupled to an energy source (not shown), is rotated the sun gear 14 is also rotated and then the planet gears 15 are in turn rotated.

The planet gears 15 rotate both on their axes and around the driving shaft 13, meshing with an internal gear 29.

A sun gear 16 which is formed integral with the carrier 17, in turn rotates as the planet gears 15 rotate around the driving shaft 13. The sun gear 16 rotates the carrier 20 by way of rotation of planet gears 18, which mesh with the internal gear 29, and as the carrier 20 is united body formed integral with driven shaft flange 22 (which is secured at the end of driven shaft 19) the sun gear 16 in turn rotates the driven shaft 19. Briefly stated, the input rotating movement exerted on driving shaft 13, is transferred to the driven shaft 19 by way of a planetary gear assembly. The driven shaft 19 has the secured flange 22 and is supported by a tapered roller bearing 21 and a thrust ball bearing 24. The outside surface of the tapered roller bearing 21 is secured within the counterbored recess 30 of the housing 11 and the inner bearing bore of which is journaled on the driven shaft 19. The thrust bearing is disposed within a space between a radially extending wall 31 of the driven shaft flange 22 and a radially extending interior wall 32 of the housing 11.

A pair of the rings of the thrust bearing 24 are secured to the walls 31 and 32, respectively extending substantially in the radial direction from the axis of shaft 19. In the presence of an exerted radial force P on the driven shaft 19 outside the housing 11, its the counterforces $R_1$ and $R_2$ are supported by the bearings 21 and 24 respectively. By this arrangement, the thrust bearing 24 is disposed a very short distance in the axial direction from bearing 21. Therefore, the bearing space required for supporting the driven shaft is minimized, thereby providing a thinner and lighter weight planetary gear reduction devices.

In heavy duty gear reduction device a thrust roller bearing may be used instead of the thrust ball bearing, which roller bearing, although more expensive, is suited for the larger counterforce $R_2$.

Also a tapered plane bearing and a thrust plane bearing may be used to reduce cost and bearing space in this invention although these result in lowered mechanical efficiency. Furthermore, provided a driven shaft has a secured flange or carrier which transfers the movement of the planetary gear assembly, the disclosed shaft supporting apparatus is usable for the driven shafts of differential gear reduction devices and compound planetary differential gear reduction devices, because the thrust bearing can be disposed between the wall of the shaft flange or carrier and the interior wall of the housing of the gear reduction device, and the same disclosed results are obtainable in any case.

Although one preferred embodiment of the invention has been described in considerable detail for illustrative purposes, many modifications will occur to those skilled in the art. It is therefore desired that the protection afforded by Letters Patent be limited only by the true scope of the appended claims.

What is claimed is:

1. In a shaft supporting apparatus for a planetary gear reduction device, said planetary gear reduction device including a housing; a driving shaft having a gear secured thereto rotatably mounted within said housing; a planetary gear assembly disposed within said housing, said planetary gear assembly meshing with the gear secured to said driving shaft; and a driven shaft having a flange secured thereto disposed within said housing, said flange being coupled to said planetary gear assembly for rotation of said driven shaft through said planetary gear assembly when a rotating force is applied to said driving shaft; the improvement comprising:

a tapered bearing for supporting said driven shaft, the outside surface of said tapered bearing being secured within a counterbored recess of said housing and the inner bore of said tapered bearing being journaled on said driven shaft, and a thrust bearing disposed between a radially extending wall of said flange and a radially extending interior wall of said housing, and comprising a pair of thrust bearing rings secured to said two walls respectively and extending substantially in a radial direction from the axis of said driven shaft, said driven shaft being supported in the presence of a radial force applied thereto by both said tapered and thrust bearings.

2. The shaft supporting apparatus according to claim 1 wherein said tapered bearing is a tapered roller bearing.

3. The shaft supporting apparatus according to claim 1 wherein said thrust bearing is a thrust ball bearing.

4. The shaft supporting apparatus according to claim 1 wherein said thrust bearing is a thrust roller bearing.

5. The shaft supporting apparatus according to claim 1 wherein said planetary gear assembly is a simple planetary gear assembly.

6. The shaft supporting apparatus according to claim 1 wherein said planetary gear assembly is a differential gear assembly.

7. The shaft supporting apparatus according to claim 1 wherein said planetary gear assembly is a compound planetary differential gear assembly.

* * * * *